Patented Jan. 15, 1935

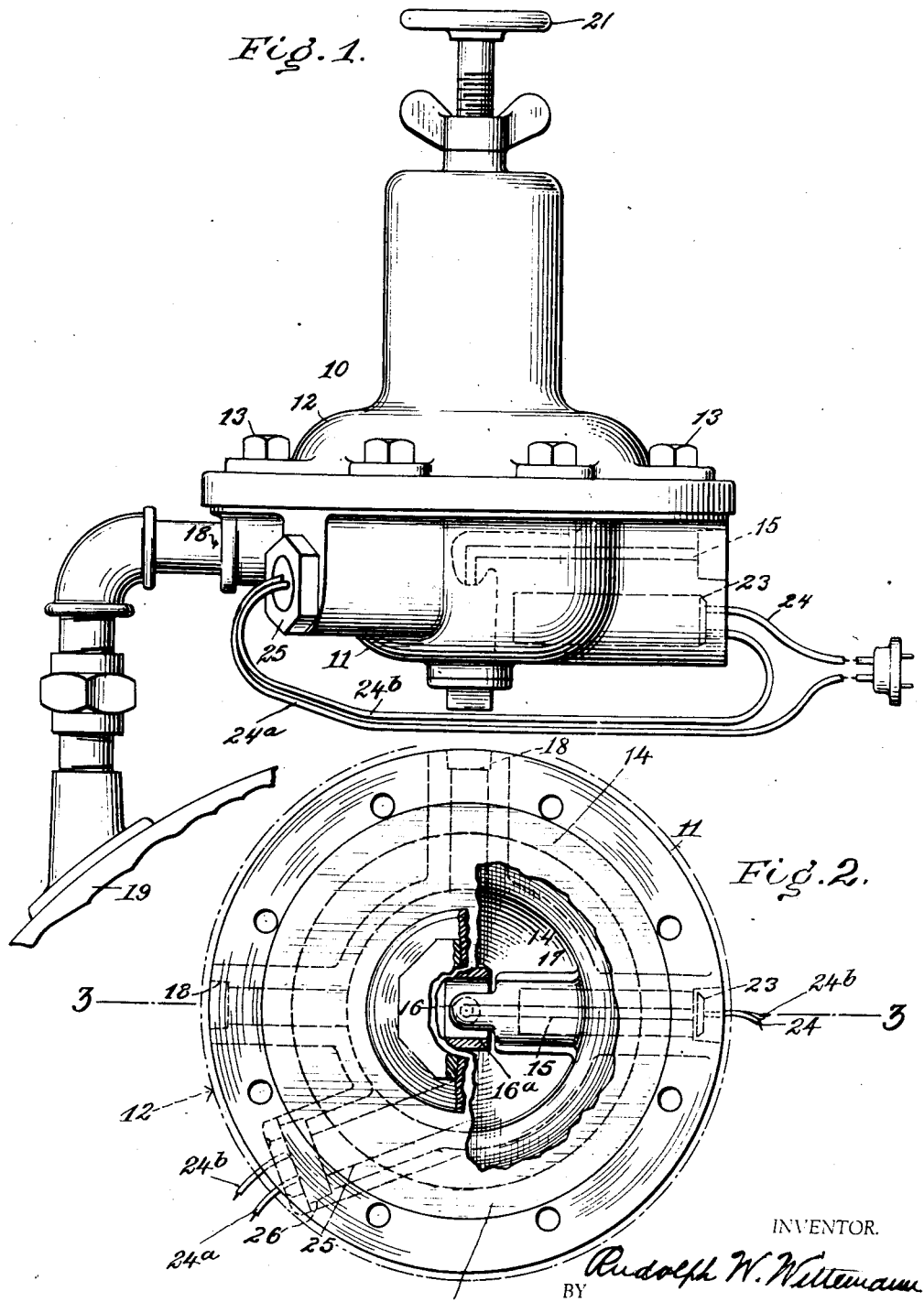

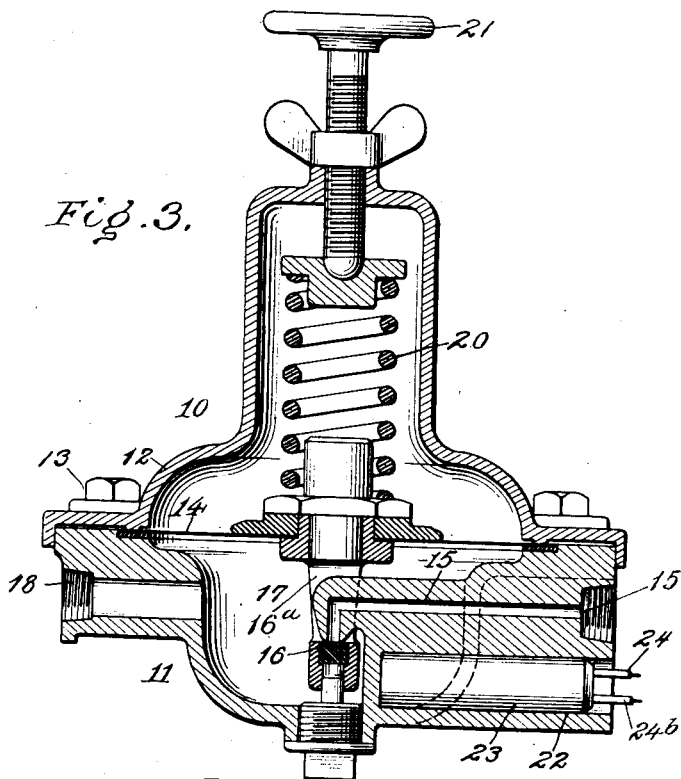
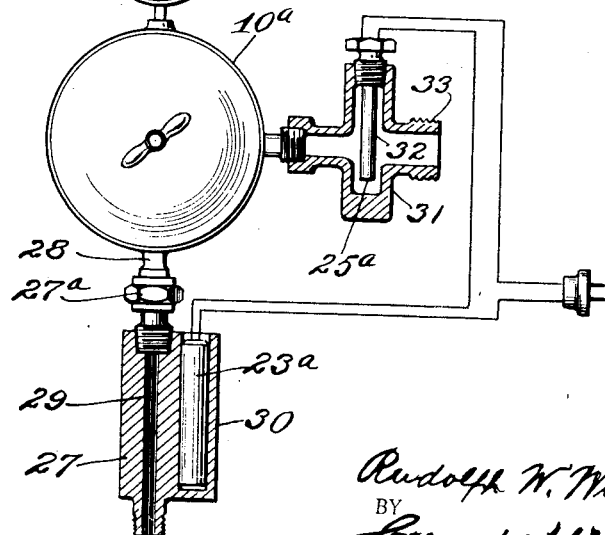

1,988,289

UNITED STATES PATENT OFFICE 1,988,289

NONFROSTING PRESSURE REDUCING REGULATOR

Rudolph W. Wittemann, Brooklyn, N. Y.

Application January 15, 1934, Serial No. 706,618

8 Claims. (Cl. 261—19)

My invention relates to improvements in means for, and methods of preventing frosting or freezing of the parts of gas pressure regulators or reducers and controlling the temperature of the gases, and the same has for its object to provide a simple, reliable, and efficient device which is operative to allow utilization of the reduced temperatures produced in the gases when the same are expanded without danger of the apparatus employed becoming clogged or otherwise rendered inoperative by frosting, and thereby obstructing or preventing the flow of the gases.

Further, said invention has for its object to effect carbonation or aeration of liquids at desirable reduced temperatures without necessitating the application of excessive heat to the gaseous component to prevent frosting of the regulator valve or other parts of the apparatus.

Further, said invention has for its object to provide a device of the character specified in which the heating means is under control to maintain uniform predetermined temperatures without resorting to the wasteful and excessive heating of the present methods in use resulting in poor or non-uniform carbonation and requiring constant attention in operation.

Further, said invention has for its object to provide a device of the character specified in which the heating element thereof is operated electrically under thermostatic control.

Further, said invention has for its object to provide a device of the character specified in which the gas and the liquid may both be brought into contact at reduced temperatures without danger of interruption of the operation by the frosting or freezing of the apparatus.

Further, said invention has for its object to provide a device of the character specified which is capable of maintaining low gas temperatures upon expansion of the gases without danger of said temperatures causing frosting or freezing of the apparatus.

Further, said invention has for its object to provide a device of the character specified in which the heating means thereof is controlled in response to thermal conditions of the expanded gases for maintaining the gas temperature at a predetermined value.

Further, said invention has for its object to provide a novel method for carbonating or aerating liquids.

Other objects will in part be obvious and in part be pointed out hereinafter.

To the attainment of the aforesaid objects and ends my invention consists in the novel features of construction, and in the combination, connection and arrangement of parts, and in the steps constituting the method hereinafter more fully described and then pointed out in the claims.

In the accompanying drawings—

Figure 1 is an elevation of one form of device constructed according to and embodying my said invention;

Fig. 2 is a plan of the lower part of the device;

Fig. 3 is a sectional elevation of the device on the line 3—3 of Fig. 2, and

Fig. 4 is an elevation, with parts in section, showing a modified form of the device.

Referring to Figs. 1 to 3, of the drawings, my device is shown incorporated in the usual pressure reducing valve 10 comprising a lower member 11 and an upper member 12 secured together by bolts 13 and having a diaphragm 14 clamped between the parts. The gas under pressure enters the device through passage 15 under the control of the valve 16 carried by a yoke $16^a$ connected to the diaphragm 14. The gas passes the valve 16 into the chamber 17, expands therein and passes out through outlet or outlets 18 into contact with the liquid to be carbonated in the carbonator 19 or other receptacle containing the liquid to be acted upon. The reduction in pressure of the gas is controlled or regulated by adjustment of the pressure exerted on the diaphragm 14 by spring 20 and adjusting screw 21.

A chamber 22 is formed in the member 11 in thermal conductive relation to the passage 15 and valve 16. An electric heating element or coil 23 is disposed within said chamber 22 and is electrically connected to one side of the line through conductor 24, the heater being adapted for use with either direct or alternating current. The circuit of the heater 23 is under the control of the circuit controlling thermostat 25 of the plug type threaded into the opening 26, and projecting into the chamber 17 in contact with the gas therein under reduced pressure. The thermostat is of the usual type and comprises the usual relatively movable contacts connected to the line through conductor $24^a$ and with the heater 23 through conductor $24^b$. The thermostatic circuit control 25 is calibrated or adjusted to close the circuit of the heater 23 when the temperature of the expanded gases in the chamber 17 drops to a predetermined value at which the valve 16, or the seat thereof tends to become frosted which would interfere with the free flow of gas through the pressure reducing valve. The adjustment of the thermostat is preferably such that as the temperature in the chamber 17 drops to 32° or 33° F. the thermostat 25 closes the circuit and energizes the heater 23, and as the temperature rises within the chamber 17 to about 34° F. the thermostat opens the circuit to interrupt the heating at 23.

The device above described is particularly adapted for use in carbonating liquids or beverages such as beers, wines, and soft drinks of various kinds. In carbonating liquids it is preferable to maintain the temperature of the liquid as low as possible, and likewise that of the $CO_2$ gas which is usually supplied in cylinders under high pressure or in a liquid or solid state. When contact is made between the liquid and the gas at low temepratures, the liquid is capable of absorbing more gas and retaining it in solution. In the manufacture of beverages, such as beer costly equipment is also employed to reduce the temperature of the beer to about 32° or 33° F., and the room or cellar in which the liquid is carbonated is also preferably maintained at substantially the same temperature. The $CO_2$ gas cools in being expanded upon passage through the regulator 10. But without control such cooling results in reductions in temperature of the gas below 32° F., resulting in frosting or freezing of the pressure reducing valve and interfering with the free flow of gases therethrough, or such temperature may drop below that at which the gas solidifies and causes the valve to become frosted and clog. In my method I maintain the temperature of the contacting gases substantially constant and at about the same as the temperature of the liquid, i. e. about 32° F., and I control the heating of the unexpanded gas in response to the thermal conditions of the expanded gas to prevent the temperature of the expanded gas from dropping below the freezing point and thereby clogging or interfering with the due operation of the apparatus. In the device employed the heating coil 23 and thermostat 25 are preferably incorporated within the pressure reduction valve 10. With the heating element thus located, the minimum amount of electrical energy is required to effect the purpose of the invention and substantially all of this energy is made available at the point most essential, i. e. the valve, without danger of heating the room in which the method is carried out. The device is also entirely automatic in operation without requiring the attention or care required when using the hot water systems now employed in practice.

By my method, I am able to utilize the reduced temperatures produced by gas expansion to the maximum extent desirable without danger of such temperatures dropping below the freezing point, and hence causing clogging or improper action of the apparatus, and without excessively heating the gas to prevent frosting and thereby cause undue temperature rise of the previously chilled liquid. I am thus able to carbonate the liquid without interruption due to frosting of the apparatus and at temperatures productive of the best product.

At Fig. 4 is illustrated a modified form of the device in the form of an accessory for application to present forms of pressure reducing valves 10ᵃ now in use. In this form of the device I provide a member 27 having a threaded coupling 27ᵃ at one end adapted to be secured to the inlet end 28 of the pressure reducer 10ᵃ, and a nipple 28 at its opposite end adapted to be secured to the container for the gas under pressure. The element 27 is provided with a passage 29 through which gas is delivered from its container to the valve 10ᵃ and with a lateral chamber 30 containing a heating element or coil 23ᵃ.

A separate element or member 31 having a chamber 32 communicates at one end through nipple 33 with the outlet of the valve 10ᵃ and at its opposite end with the carbonator. A thermostatic circuit controlling element 25ᵃ is threaded into the casing 31 for controlling the heating coil as above described.

The device embodying my invention may also be employed in other arts besides that of carbonating beverages, such as in connection with submarine air bells or bottles where large volumes of gas or air must be expanded in a short time without causing dangerous freezing or frosting of the gas pressure reducers.

By my invention, I am able to carbonate beverages with both the liquid and gas maintained at reduced temperatures approximating the freezing point of water so that the gas is more readily absorbed by, and maintained uniformly distributed throughout the liquid, and this is accomplished by controlling the gas temperature to prevent cooling of the gas upon expansion thereof to an extent liable to cause frosting of the apparatus and resultant interference with its operation.

It will, of course, be understood that in certain cases, as for example, the carbonating of water in which operation it is customary to use dry $CO_2$ gas supplied directly from cylinders, that the said gas at temperatures materially below the freezing point of water may be admixed to the water before the valve will become frosted and clog or its due operation otherwise interfered with.

Having thus described my said invention what I claim and desire to secure by Letters Patent is:

1. The hereindescribed method of aerating liquids which consists in applying heat to a gaseous fluid under pressure for preventing undue reduction in the temperature of the gaseous fluid when the same expands, expanding said gas and causing the same to contact with the liquid, and controlling the heat applied, in response to the thermal conditions of the expanded gas, to maintain the temperature of the latter substantially constant.

2. The hereindescribed method of aerating liquids which consists in expanding a gas under pressure and causing the same to contact with a liquid at approximately the freezing point while applying heat to the gas, and controlling the heat applied to maintain the temperature of the expanded gas at approximately the freezing point of water.

3. The hereindescribed method of carbonating liquids which consists in applying heat to a gas under pressure and releasing said gas to allow said gas to expand and decrease in temperature, causing the expanded gas to contact with a liquid maintained at a reduced temperature, and controlling the heat applied in response to the thermal conditions of the expanded gas so as to prevent the temperature thereof from falling below the freezing point of water.

4. The hereindescribed method of carbonating liquids which consists in applying heat to a gas under pressure, expanding and cooling said gas and causing said gas to contact with the liquid at a temperature approximating the freezing point of water, and controlling the heat applied to the gas to maintain the temperature of the expanded gas at approximately that of the liquid.

5. A device of the character described comprising a gas pressure regulator, an electric heater at the inlet side of said regulator, and thermostatic means at the outlet sides of said regulator for controlling the circuit of said heater.

6. A device of the character described comprising a casing having gas pressure regulating means therein, and inlet and outlet passages therein, said casing having a chamber therein adjacent said inlet passage, an electric heating element disposed in said chamber, and a thermostatic element extending into said casing at the outlet side thereof for controlling the circuit of said heating element.

7. A device of the character described comprising a casing having gas pressure regulating means therein, and inlet and outlet passages therein, said casing having a chamber therein in heat conducting relation to said inlet passage, a heating element disposed in said chamber, and a thermostatic element extending into said casing at the outlet side thereof for controlling the supply of heating medium to said heating element.

8. The hereindescribed method of controlling the temperature of a gas which consists in expanding the gas, applying heat thereto, causing the same to contact with a liquid at approximately the freezing temperature of water, and controlling the heat applied in response to thermal conditions of the expanded gas to maintain the temperature thereof above the frosting point and not appreciably in excess of the temperature of said liquid.

RUDOLPH W. WITTEMANN.